(12) United States Patent
Dan

(10) Patent No.: US 9,144,991 B2
(45) Date of Patent: Sep. 29, 2015

(54) LIQUID STORAGE DEVICE

(71) Applicant: Kenichi Dan, Nagoya (JP)

(72) Inventor: Kenichi Dan, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/225,734

(22) Filed: Mar. 26, 2014

(65) Prior Publication Data

US 2014/0292892 A1    Oct. 2, 2014

(30) Foreign Application Priority Data

Mar. 29, 2013    (JP) ................. 2013-073215

(51) Int. Cl.
 *B41J 29/393*    (2006.01)
 *B41J 2/175*    (2006.01)
 *G01F 23/28*    (2006.01)
 *G01F 23/284*    (2006.01)

(52) U.S. Cl.
 CPC .......... *B41J 2/17566* (2013.01); *B41J 2/17503* (2013.01); *B41J 2/17513* (2013.01); *B41J 2/17546* (2013.01); *G01F 23/28* (2013.01); *G01F 23/282* (2013.01); *G01F 23/284* (2013.01); *G01F 23/2845* (2013.01); *B41J 2002/17569* (2013.01); *B41J 2029/3937* (2013.01)

(58) Field of Classification Search
 CPC ............. B41J 2/17566; B41J 2/17503; G01F 23/2845; G01F 23/284; G01F 23/282; G01F 23/28
 USPC ...................................... 347/7, 36
 See application file for complete search history.

(56) References Cited

U.S. PATENT DOCUMENTS

| 5,148,378 A | 9/1992 | Shibayama et al. |
| 7,107,836 B2 * | 9/2006 | Brookner ..................... 73/290 R |
| 7,113,125 B2 * | 9/2006 | Le Sesne ....................... 342/124 |
| 2014/0210670 A1 * | 7/2014 | Weber ........................... 342/385 |

FOREIGN PATENT DOCUMENTS

| DE | 102013100817 | * 7/2014 | ............... G01V 3/12 |
| JP | S63115756 | 5/1988 | |

(Continued)

OTHER PUBLICATIONS

Notice of Reasons for Refusal for JP application No. 2013-073215 dated Jul. 28, 2015.

*Primary Examiner* — Julian Huffman
(74) *Attorney, Agent, or Firm* — Frommer Lawrence & Haug LLP

(57) ABSTRACT

A liquid storage device includes: a liquid storage having a storage chamber for storing liquid; first communication devices each for transmitting a radio wave for carrying out short distance wireless communication; a second communication device for receiving the radio wave transmitted from each first communication device; and a controller. The first communication devices are arranged in a configuration corresponding to a direction of movement of a boundary surface between a liquid stored area and a liquid non-stored area in the storage chamber. The movement is caused by increase or decrease of an amount of the liquid in the storage chamber. The storage chamber is partly interposed between the second communication device and the first communication devices. The controller detects a position of the boundary surface based on a reception status of the radio wave transmitted from each first communication device and received by the second communication device.

11 Claims, 10 Drawing Sheets

(56) References Cited

FOREIGN PATENT DOCUMENTS

| JP | H02143116 | | 6/1990 | | |
| JP | 8-104014 | * | 4/1996 | ................. | B41J 2/18 |
| JP | 2002/133458 | | 5/2002 | | |
| JP | 2004-050417 | | 2/2004 | | |
| JP | 2006/290402 | | 10/2006 | | |
| JP | 2009-096006 | | 5/2009 | | |
| JP | 2012-024982 | | 2/2012 | | |

* cited by examiner

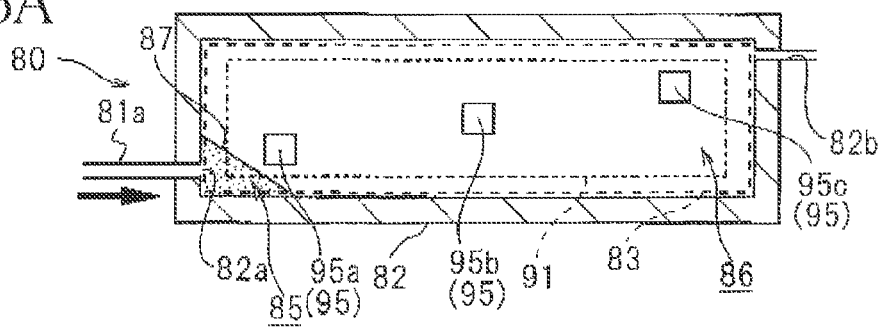
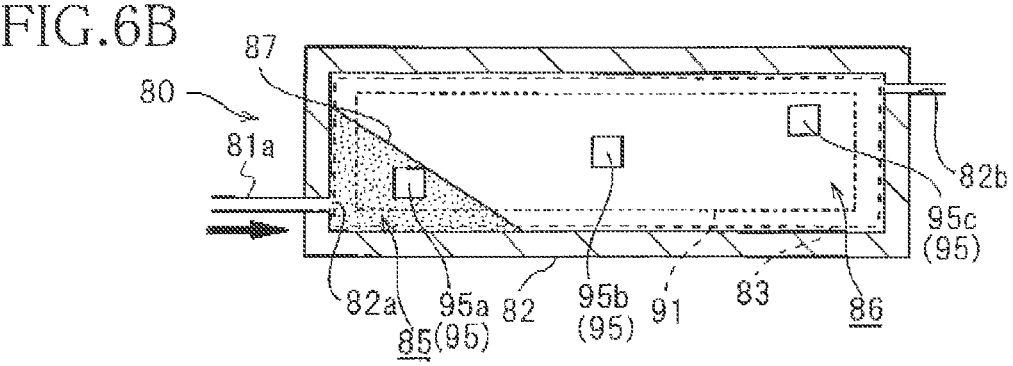
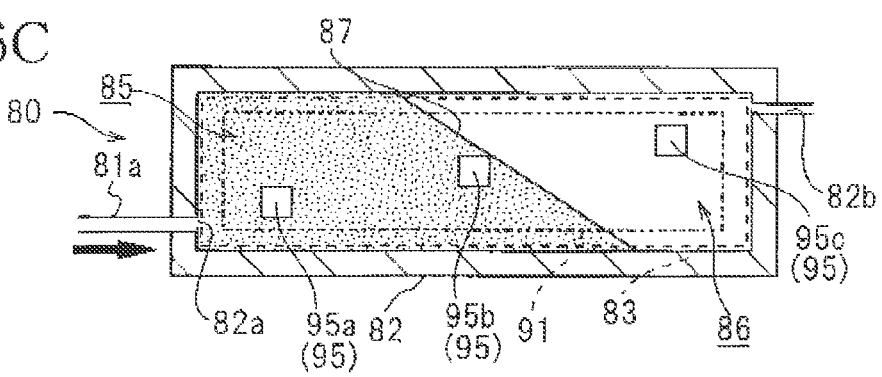
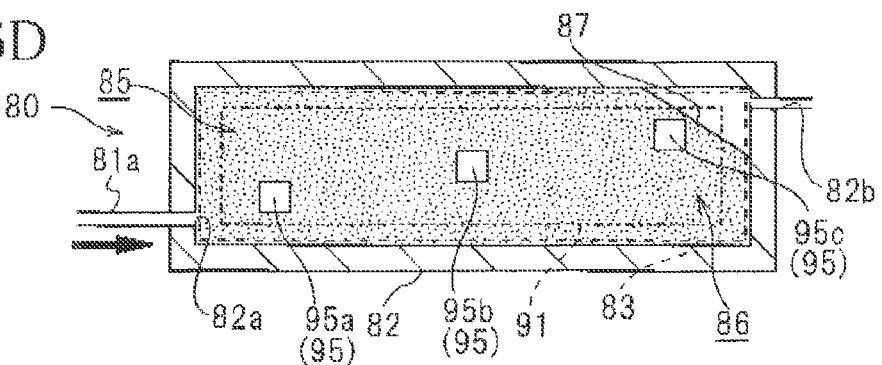

TAG B FAILURE

TAGS B, C FAILURE

TAG C FAILURE

TAG C FAILURE

TAG B FAILURE

TAGS B, C FAILURE

TAG C FAILURE

LIQUID STORAGE DEVICE

CROSS REFERENCE TO RELATED APPLICATION

The present application claims priority from Japanese Patent Application No. 2013-073215, which was filed on Mar. 29, 2013, the disclosure of which is herein incorporated by reference in its entirety.

BACKGROUND OF THE INVENTION

1. Field of the Invention

The present invention relates to a liquid storage device.

2. Description of the Related Art

There are known various liquid storage devices each including a storage chamber for storing liquid and a controller for recognizing an amount of liquid stored in the storage chamber. One example of such liquid storage devices includes: an ink cartridge for storing ink to be supplied to a print head for ejecting ink droplets; and a central processing unit for calculating a remaining amount of ink stored in the ink cartridge. This central processing unit uses software to calculate an amount of ink ejected from the print head based on print data and calculate the remaining amount of ink stored in the ink cartridge based on the calculated amount of ink ejected from the print head.

SUMMARY OF THE INVENTION

However, the above-described method of using software to calculate the remaining amount of ink stored in the ink cartridge may suffer from an error in the calculated amount of liquid ejected from the print head, causing a problem that the calculated ink amount differs from an actual ink amount.

This invention has been developed to provide a liquid storage device capable of accurately recognizing an amount of liquid stored in a storage chamber stepwise.

The present invention provides a liquid storage device including: a liquid storage formed with a storage chamber for storing liquid; a plurality of first communication devices each configured to transmit a radio wave for carrying out short distance wireless communication; a second communication device configured to receive the radio wave transmitted from each of the plurality of first communication devices; and a controller. The plurality of first communication devices are arranged in a configuration corresponding to a direction of a movement of a boundary surface between a stored area where the liquid is stored in the storage chamber and a non-stored area where the liquid is not stored in the storage chamber. The movement is caused by one of an increase and a decrease of an amount of the liquid stored in the storage chamber. A portion of the storage chamber is interposed between the second communication device and each of the plurality of first communication devices. The controller is configured to detect a position of the boundary surface based on a reception status of the radio wave transmitted from each of the plurality of first communication devices and received by the second communication device.

The present invention provides a liquid storage device including: a liquid storage formed with a storage chamber for storing liquid; a plurality of first communication devices each configured to carry out short distance wireless communication; a second communication device configured to carry out short distance wireless communication with the plurality of first communication devices; and a controller. The plurality of first communication devices are arranged in a configuration corresponding to a direction of a movement of a boundary surface between a stored area where the liquid is stored in the storage chamber and a non-stored area where the liquid is not stored in the storage chamber. The movement is caused by one of an increase and a decrease of an amount of the liquid stored in the storage chamber. A portion of the storage chamber is interposed between the second communication device and each of the plurality of first communication devices. The controller is configured to detect a position of the boundary surface based on a state of establishment of the short distance wireless communication between each of the plurality of first communication devices and the second communication device.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 6A-6D are cross-sectional views for explaining a movement of a boundary surface between an absorbing area and a non-absorbing area in a waste liquid collecting tank illustrated in FIG. 1;

DETAILED DESCRIPTION OF THE EMBODIMENT

Figure 1:
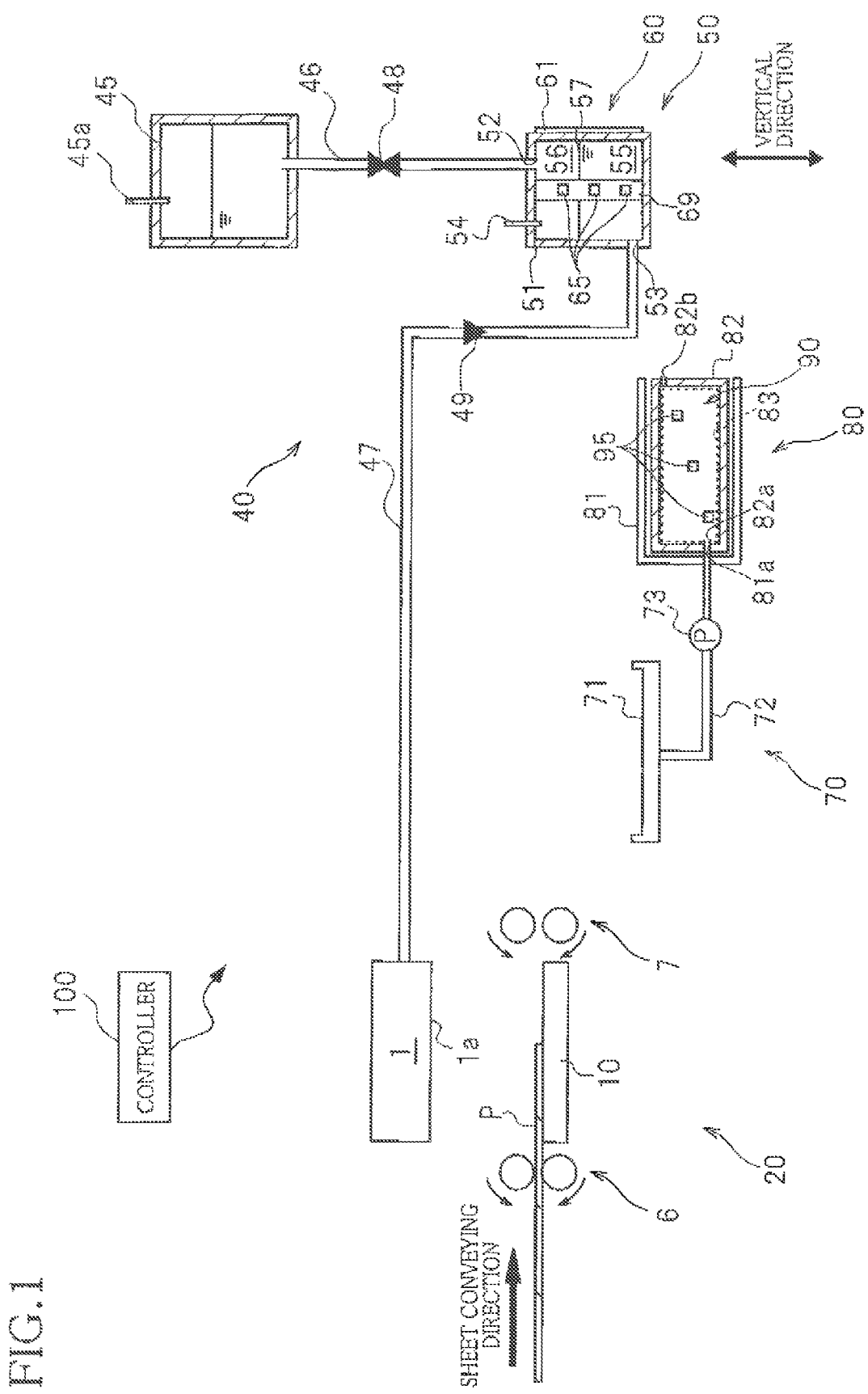
FIG. 1 is a cross-sectional view schematically illustrating an ink-jet printer according to one embodiment of the present invention.

Hereinafter, there will be described, with reference to the drawings, an ink-jet printer including a liquid storage (reservoir) device according to one embodiment of the present invention. As illustrated in FIG. 1, an ink-jet printer 101 includes an ink-jet head 1, a conveyor mechanism 20, an ink transfer mechanism 40, a suction purging mechanism 70, a waste liquid collecting device 80, a touch panel 30 (see FIG. 4), and a controller 100 for controlling operations of the ink-jet printer 101. In the present embodiment, the waste liquid collecting device 80 and the controller 100 are one example of the liquid storage device, and a temporary storage (reservoir) device 50 (which will be described below) of the ink transfer mechanism 40 and the controller 100 are one example of the liquid storage device.

The conveyor mechanism 20 conveys a sheet P in a conveying direction coinciding with a right direction in FIG. 1 and includes a first conveyor unit 6, a second conveyor unit 7, and a platen 10. The first conveyor unit 6 nips the sheet P supplied from a sheet-supply mechanism, not shown, and conveys the sheet P in the conveying direction. The second conveyor unit 7 nips the sheet P conveyed by the first conveyor unit 6 and conveys the sheet P further toward the downstream side in the conveying direction. The platen 10 is disposed between the first conveyor unit 6 and the second conveyor unit 7 in the conveying direction. This platen 10 supports a lower side of the sheet P being conveyed by the first conveyor unit 6 and the second conveyor unit 7.

The ink-jet head 1 (hereinafter simply referred to as "head 1") is disposed opposing the platen 10. A lower surface of the head 1 is an ejection surface 1a having a multiplicity of ejection openings for ejecting ink. An ink supply tube 47 (which will be described below) of the ink transfer mechanism 40 is connected to the head 1. The interior of the head 1 has a multiplicity of channels through which the ink supplied from the ink transfer mechanism 40 through the ink supply tube 47 is transferred to the respective ejection openings. The head 1 ejects ink droplets from the ejection openings when the sheet P being conveyed by the conveyor mechanism 20 passes through a position just below the head 1. As a result, a desired image is recorded on the sheet P. The recorded sheet P is conveyed by the conveyor mechanism 20 further toward the downstream side in the conveying direction and discharged onto a sheet-output tray, not shown.

The ink transfer mechanism 40 supplies ink to the head 1. As illustrated in FIG. 1, the ink transfer mechanism 40 includes a cartridge 45, an ink supply tube 46, the ink supply tube 47, a valve 48, a check valve 49, and the temporary storage device 50.

The cartridge 45 stores ink to be supplied to the head 1. An upper wall of the cartridge 45 has an air communicating hole 45a for establishing communication between the interior of the cartridge 45 and an ambient air. The temporary storage device 50 temporarily stores the ink supplied from the cartridge 45, before the ink is supplied to the head 1. The temporary storage device 50 will be explained later in detail.

The ink supply tube 46 establishes communication between the cartridge 45 and an inlet opening 52 (which will be described below) of the temporary storage device 50. This ink supply tube 46 is provided with the valve 48 which can selectively switch a state of the valve 48 between a closed state in which a channel of the ink supply tube 46 is closed and an open state in which the channel of the ink supply tube 46 is not closed. This ink supply tube 47 establishes communication between an output opening 53 (which will be described below) of the temporary storage device 50 and the head 1. This ink supply tube 47 is provided with the check valve 49 which allows the ink to flow from the temporary storage device 50 to the head 1 and inhibits the ink from flowing from the head 1 to the temporary storage device 50.

Here, as illustrated in FIG. 1, the cartridge 45 is disposed above the temporary storage device 50 in the vertical direction. In other words, the cartridge 45 is located at a higher level than the temporary storage device 50 in the vertical direction. As a result, when the valve 48 is opened to establish the open state of the valve 48, the ink in the cartridge 45 can be supplied to the temporary storage device 50 through the ink supply tube 46 to replenish the temporary storage device 50.

The suction purging mechanism 70 performs a suction purging operation to recover an ejection characteristic of the head 1 when the ejection characteristic is lowered due to increase in viscosity of the ink or other similar causes. As illustrated in FIG. 1, the suction purging mechanism 70 includes a cap member 71, a waste liquid tube 72, and a suction pump 73.

The cap member 71 is formed of elastic material and can be held in close contact with the ejection surface 1a of the head 1 in a state in which the cap member 71 encloses the ejection openings. During an image recording operation, the cap member 71 is disposed at a wait position which is located on an outer side of an area opposing the sheet P. When the suction purging operation is to be performed, the cap member 71 is moved to a maintenance position at which the cap member 71 is opposed to and held in close contact with the ejection surface 1a of the head 1.

The waste liquid tube 72 establishes communication between the cap member 71 and the waste liquid collecting device 80. The waste liquid tube 72 is provided with the suction pump 73. In the suction purging operation during which the cap member 71 is located at the maintenance position, the suction pump 73 sucks air from the interior of the cap member 71 and thereby reduces a pressure in the cap member 71 to forcibly discharge the ink from the ejection openings of the head 1 into the cap member 71. This operation can recover the ejection characteristic of the head 1. It is noted that the ink discharged from the ejection openings into the cap member 71 in the suction purging operation (noted that such ink is hereinafter referred to as "waste liquid") is discharged to the waste liquid collecting device 80 through the waste liquid tube 72. The waste liquid collecting device 80 will be explained later in detail.

Figure 2:
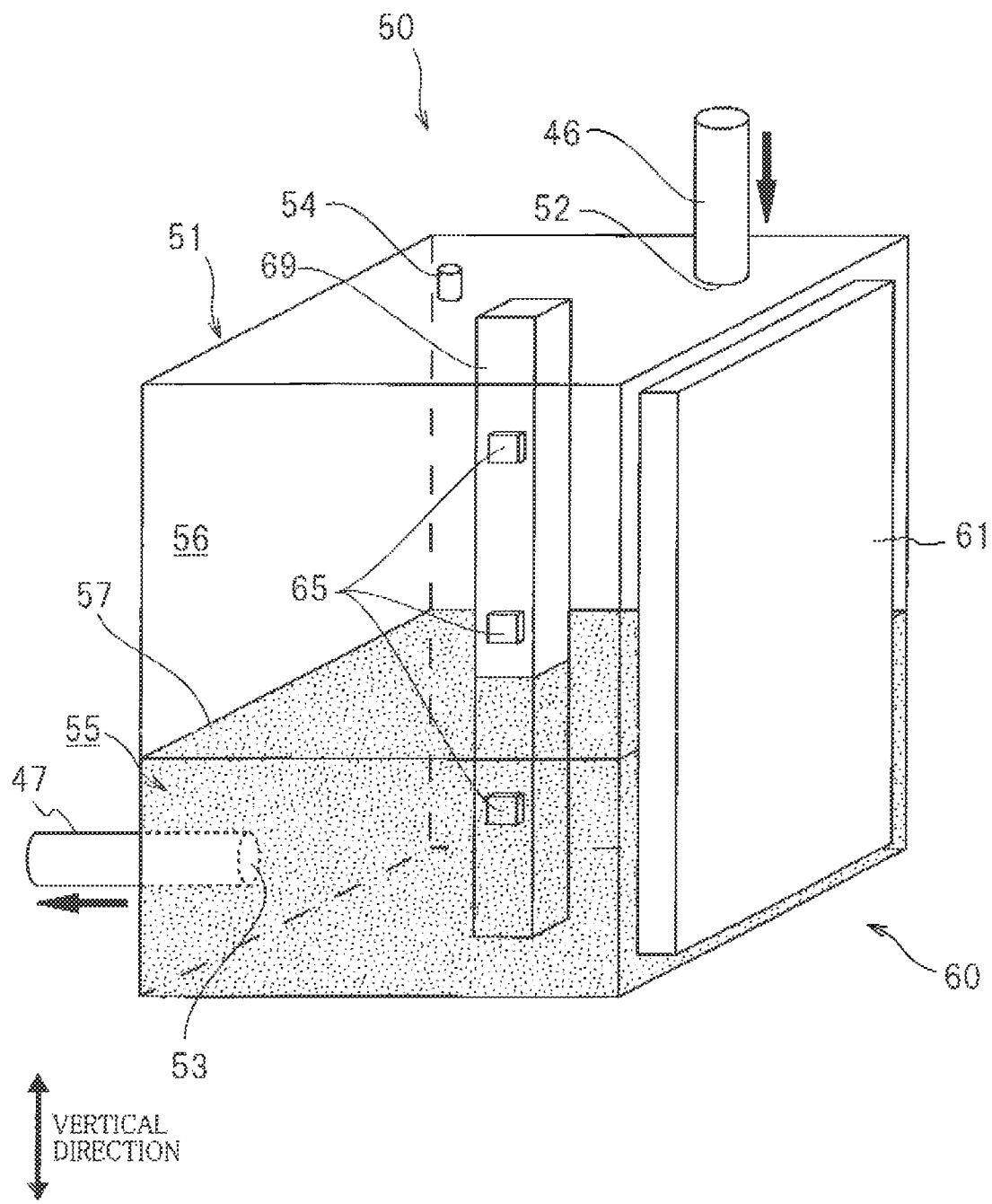
FIG. 2 is a perspective view schematically illustrating a temporary storage device illustrated in FIG. 1.

There will be next explained the temporary storage device 50 in detail with reference to FIG. 2. The temporary storage device 50 includes: a sub-tank 51 having a storage chamber or a reservoir chamber for temporarily storing ink; and an ink-amount detection device 60 for detecting an amount of ink stored in the sub-tank 51.

An upper face of the sub-tank 51 has: the inlet opening 52 connected to the ink supply tube 46; and an air communicating hole 54 for establishing communication between the interior of the sub-tank 51 and an ambient air. The ink in the cartridge 45 which flows through the ink supply tube 46 is supplied from this inlet opening 52 into the sub-tank 51 to replenish the sub-tank 51 with the ink. Also, the output opening 53 connected to the ink supply tube 47 is formed in one side face of the sub-tank 51 at a lower portion thereof in the vertical direction. The ink stored in the sub-tank 51 is supplied from this output opening 53 to the head 1 through the ink supply tube 47.

The sub-tank 51 is disposed below the ejection surface 1a of the head 1 in the vertical direction. In other words, the sub-tank 51 is located at a lower height level than the ejection surface 1a of the head 1 in the vertical direction. As a result, a water head difference is generated between ink meniscuses formed near the ejection openings of the head 1 and a liquid surface of the ink stored in the sub-tank 51, so that a negative pressure lower than the atmospheric pressure is generated in an ink-side portions of the ink meniscuses. This negative pressure can prevent the ink from being ejected from the ejection openings of the head 1 at times other than the image recording operation.

The ink-amount detection device 60 includes a reader/writer device 61 (as one example of a second communication device), three tags 65 (each as one example of a first communication device), and a tag fixedly supporting member 69 for fixedly supporting the three tags 65 in the sub-tank 51.

Figure 4:
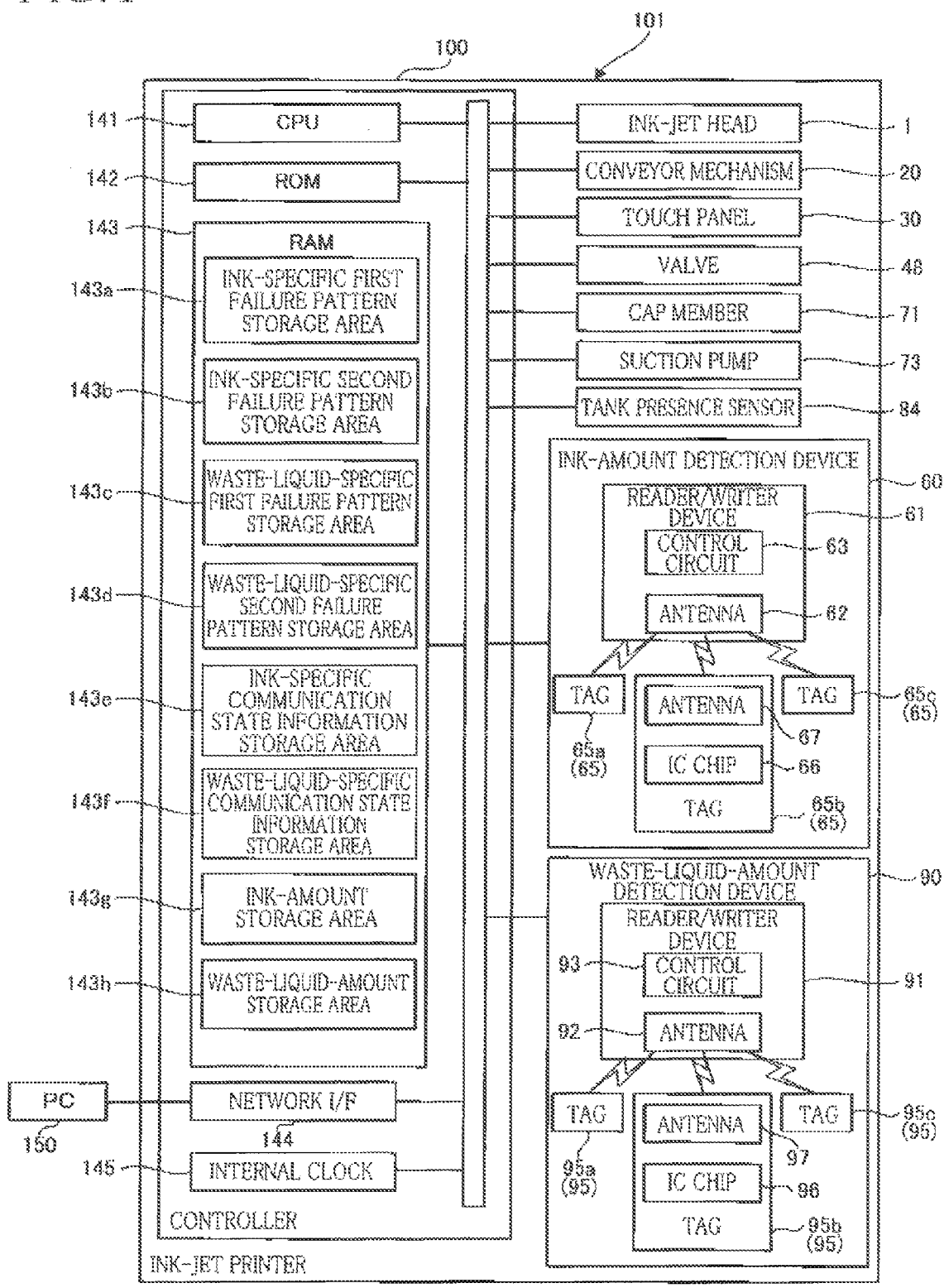
FIG. 4 is a block diagram illustrating an electric configuration of the ink-jet printer illustrated in FIG. 1.

The reader/writer device 61 is provided on an outer face of one of side walls of the sub-tank 51 and configured to transmit and receive a radio wave to and from each of the three tags 65 to carry out short distance wireless communication (e.g., wireless communication whose communicable distance or range is ranged from several centimeters to several meters) with each tag 65. As illustrated in FIG. 4, the reader/writer device 61 includes an antenna 62 and a control circuit 63 for controlling the antenna 62 to transmit and receive radio waves. Specifically, the control circuit 63 controls the antenna 62 to transmit a radio wave to each of the three tags 65 and receive a radio wave transmitted from an antenna 67 (which will be described below) provided in each tag 65.

Each of the three tags 65 is an RFID (Radio Frequency Identification) tag not provided any electric power unit such as a battery, that is, each tag 65 is what is called a passive RFID tag. As illustrated in FIG. 4, each tag 65 includes an IC chip 66 and the antenna 67 shaped like a coil which are provided inside the tag 65. This IC chip 66 stores identification information (as one example of an identification information set) unique to each tag 65 for identifying each tag 65. Each tag 65 is powered by a radio wave transmitted from the reader/writer device 61 to the antenna 67 and configured to transmit a part of the received radio wave to the reader/writer device 61 as a reflected wave. Superposed on the reflected wave is a response signal which contains the identification information stored in the IC chip 66 provided inside the tag 65.

The tag fixedly supporting member 69 is a rod member having a generally rectangular parallelepiped shape. The tag fixedly supporting member 69 is connected at its upper end to a center of an inside top of the sub-tank 51 and its lower end to a center of an inside bottom of the sub-tank 51. Also, the tag fixedly supporting member 69 fixedly supports the three tags 65 in the sub-tank 51 such that the three tags 65 are evenly spaced apart from each other in the vertical direction. The interior of the sub-tank 51 can be divided into a stored area 55 where ink is stored and a non-stored area 56 where no ink is stored. The three tags 65 are arranged along a direction of a movement of a boundary surface 57 between the stored area 55 and the non-stored area 56 in the sub-tank 51 with increase or decrease in the amount of ink stored in the sub-tank 51. Since the three tags 65 are disposed in the sub-tank 51, there is at least a portion of the interior of the sub-tank 51 between the three tags 65 and the reader/writer device 61. In other words, the tags 65 and the reader/writer device 61 are disposed such that the radio wave transferred between the tags 65 and the reader/writer device 61 passes through the interior of the sub-tank 51. The three tags 65 include: a tag 65a located at the lowermost position in the vertical direction among the three tags 65; a tag 65c located at the uppermost position in the vertical direction among the three tags 65; and a tag 65b located interposed between the tag 65a and the tag 65c in the vertical direction. It is noted that the direction of the movement of the boundary surface 57 which is caused by increase or decrease of the amount of ink stored in the sub-tank 51 is the vertical direction, and the tags 65a, 65b, and 65c are arranged at different positions from each other in the vertical direction.

In the present embodiment, the radio wave transferred for carrying out the short distance wireless communication between the reader/writer device 61 and each of the three tags 65 is a microwave which is easily absorbed into liquid having a polarity. The ink stored in the sub-tank 51 is liquid whose solvent is water having a polarity. Accordingly, in a case where there is ink between the reader/writer device 61 and the tag 65, a radio wave therebetween is absorbed into the ink when the radio wave passes through the ink or the stored area 55, resulting in attenuation of the radio wave. This attenuation lowers the intensity of the radio wave transmitted from the tag 65 and received by the reader/writer device 61.

In the present embodiment, the intensity of the radio wave transmitted from the reader/writer device 61 to each tag 65 is set such that the intensity of the radio wave transmitted from the certain tag 65 and received by the reader/writer device 61 is the smallest intensity which allows establishment of a short distance wireless communication therebetween in a state in which the boundary surface 57 is located below the height level of the certain tag 65 in the vertical direction (i.e., a state in which there is no ink between the reader/writer device 61 and the certain tag 65 or a state in which the radio wave transferred between the reader/writer device 61 and the certain tag 65 passes through the non-stored area 56 in the sub-tank 51). Accordingly, when the boundary surface 57 is located at or above the height level of the certain tag 65 in the vertical direction (that is, when there is ink between the reader/writer device 61 and the certain tag 65), the reader/writer device 61 cannot receive any radio wave from the certain tag 65, so that the short distance wireless communication cannot be established between the reader/writer device 61 and the certain tag 65. Therefore, detection of the presence or absence of establishment of the short distance wireless communication between each tag 65 and the reader/writer device 61 allows the controller 100 to determine whether there is ink between each tag 65 and the reader/writer device 61 in the sub-tank 51 or not. In the present embodiment, the establishment of the short distance wireless communication means a state in which the reader/writer device 61 can receive and recognize the response signal superposed on the reflected wave that is transmitted from the tag 65 in response to the radio wave transmitted from the reader/writer device 61 to the tag 65.

Since the three tags 65 are disposed in the sub-tank 51, when the boundary surface 57 is located above the height level of the tag 65 in the vertical direction, the tag 65 is surrounded with the ink. Accordingly, the radio wave transmitted from the tag 65 to the reader/writer device 61 inevitably passes through the ink, thereby reliably lowering the intensity of the radio wave transmitted from the tag 65 and received by the reader/writer device 61. As a result, the controller 100 can more accurately determine whether there is ink between each tag 65 and the reader/writer device 61 or not.

There will be next explained a processing for transferring communication state information between the controller 100 and the reader/writer device 61. This communication state information represents the presence or absence of the establishment of the short distance wireless communication between each tag 65 and the reader/writer device 61.

The controller 100 sends the reader/writer device 61 an output request for requesting an output of the communication state information. Having received the output request, the control circuit 63 of the reader/writer device 61 controls the antenna 62 to transmit a radio wave to each tag 65. Also, the control circuit 63 refers to the identification information contained in the response signal superposed on the radio wave transmitted from the tag 65 and received by the antenna 62. Based on this identification information, the control circuit 63 determines whether the short distance wireless communication has been established between the reader/writer device 61 and each tag 65 or not, and the control circuit 63 creates the communication state information based on a result of this determination. The control circuit 63 then transmits the communication state information to the controller 100. As a result, the controller 100 can obtain the communication state information from the reader/writer device 61. Based on this communication state information, the controller 100 can determine whether there is ink between each tag 65 and the reader/writer device 61 in the sub-tank 51 or not. Thus, the controller 100 can recognize or detect the position of the boundary surface 57 and the amount of ink stored in the sub-tank 51.

Also, when a communication state between one of the tags 65 and the reader/writer device 61 has changed from a state in which the short distance wireless communication is established (hereinafter referred to as "established state") to a state in which the short distance wireless communication is not established (hereinafter referred to as "non-established state") or vice versa, the controller 100 determines that the position of the boundary surface 57 has been moved across the one tag 65.

Figure 3:
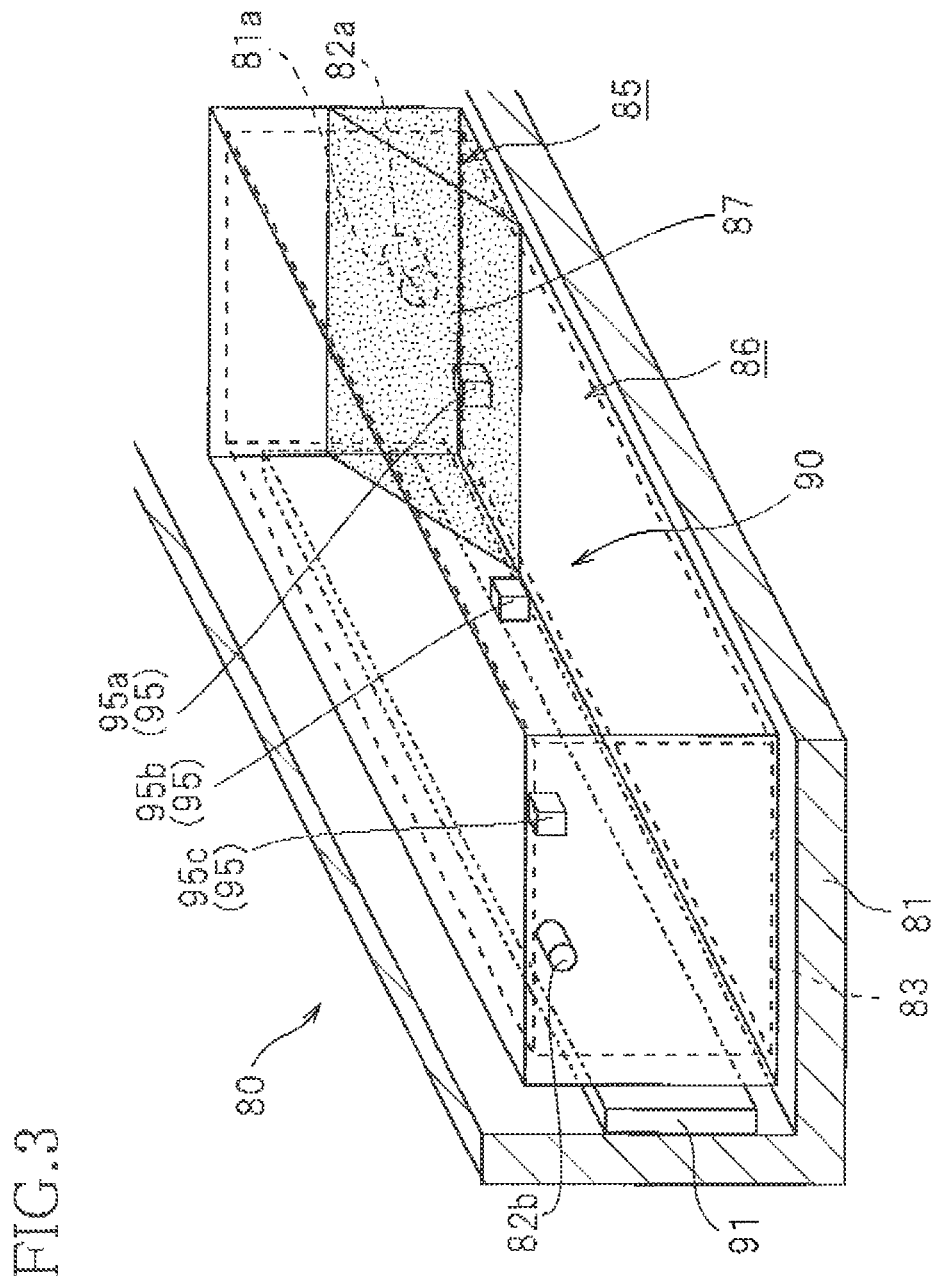
FIG. 3 is a perspective view schematically illustrating a waste liquid collecting device illustrated in FIG. 1.

There will be next explained the waste liquid collecting device 80 in detail with reference to FIG. 3. The waste liquid collecting device 80 includes: a tank holder 81; a waste liquid collecting tank 82 having a storage chamber which is removably mounted on the tank holder 81 and which can be replaced as needed; an ink absorber 83 which can absorb waste liquid; a tank presence sensor 84 (see FIG. 4) for detecting whether the waste liquid collecting tank 82 is being mounted on the tank holder 81 or not; and a waste-liquid-amount detection device 90 for detecting an amount of waste liquid stored in the waste liquid collecting tank 82.

The tank holder 81 has a three-sided rectangular shape in cross section, and the waste liquid collecting tank 82 is mountable on the tank holder 81. A bottom portion of the tank holder 81 is provided with a joint 81a to which the waste liquid tube 72 is connected. The waste liquid collecting tank 82 is a casing having a rectangular shape in cross section, and the entire area of the waste liquid collecting tank 82 is filled with the ink absorber 83 formed of porous material. One of side faces of the waste liquid collecting tank 82 has a supply opening 82a which is connected to the joint 81a when the waste liquid collecting tank 82 is mounted on the tank holder 81. The waste liquid produced in the suction purging mechanism 70 is transferred from the supply opening 82a into the waste liquid collecting tank 82 and absorbed into the ink absorber 83. It is noted that an air communicating hole 82b is formed in another of the side faces of the waste liquid collecting tank 82 which differs from the one side face having the supply opening 82a, and air in the waste liquid collecting tank 82 is discharged to the outside through this air communicating hole 82b.

As illustrated in FIG. 3, the ink absorber 83 can be divided into an absorbing area 85 where waste liquid has been absorbed and a non-absorbing area 86 where no waste liquid is absorbed. That is, the absorbing area 85 is a stored area in which waste liquid is stored in the waste liquid collecting tank 82, and the non-absorbing area 86 is a non-stored area in which no waste liquid is stored in the waste liquid collecting tank 82. When waste liquid is supplied from the supply opening 82a into the waste liquid collecting tank 82, waste liquid permeates or percolates through the ink absorber 83 in a direction away from the supply opening 82a. That is, a boundary surface 87 between the absorbing area 85 and the non-absorbing area 86 moves in the direction away from the supply opening 82a in a direction in which the waste liquid permeates.

The tank presence sensor 84 is an optical sensor having a light emitting element and a light receiving element and provided on the tank holder 81. When light emitted from the light emitting element is intercepted by the waste liquid collecting tank 82 mounted on the tank holder 81, the tank presence sensor 84 detects the mounted state and outputs a detection signal to the controller 100. As a modification, the tank presence sensor 84 may be a contact-type sensor in which when the waste liquid collecting tank 82 is being mounted on the tank holder 81, a contact provided on the tank holder 81 and a contact provided on the waste liquid collecting tank 82 are brought into contact with each other, and the tank presence sensor 84 detects the mounted state of the waste liquid collecting tank 82 based on continuity between the contacts.

The waste-liquid-amount detection device 90 is a sensor having a structure similar to that of the ink-amount detection device 60. It is noted that reference numerals obtained by adding thirty to the reference numerals of the elements of the ink-amount detection device 60 are used to designate the corresponding elements of the waste-liquid-amount detection device 90, and an explanation of which is dispensed with.

The waste-liquid-amount detection device 90 includes a reader/writer device 91 (as one example of the second communication device) and three tags 95 (each as one example of the first communication device). The reader/writer device 91 is provided on an inner face of one of side walls of the tank holder 81. The reader/writer device 91 is disposed so as to overlap all the three tags 95 when viewed in a direction perpendicular to a direction in which the waste liquid collecting tank 82 is mounted on the tank holder 81 and in a direction parallel to the horizontal plane.

The three tags 95 are arranged inside the ink absorber 83 accommodated in the waste liquid collecting tank 82 along the direction in which the waste liquid supplied from the supply opening 82a permeates through the ink absorber 83. That is, the three tags 95 are arranged in a configuration or layout corresponding a direction of a movement of the boundary surface 87 between the absorbing area 85 and the non-absorbing area 86 which is caused by an increase in the amount of waste liquid stored in the waste liquid collecting tank 82. Since the three tags 95 are arranged in the ink absorber 83, there is at least a portion of the interior of the waste liquid collecting tank 82 between each of the three tags 95 and the reader/writer device 91. In other words, the tags 95 and the reader/writer device 91 are disposed such that the radio wave transferred between the tags 95 and the reader/writer device 91 passes through the interior of the waste liquid collecting tank 82. It is noted that the three tags 95 are arranged at different positions from each other in the direction of the movement of the boundary surface 87, i.e., the direction in which the waste liquid supplied from the supply opening 82a permeates through the ink absorber 83.

The controller 100 sends the reader/writer device 91 an output request for requesting an output of communication state information representing the presence or absence of the establishment of the short distance wireless communication between each tag 95 and the reader/writer device 91. Based on the communication state information transmitted from the reader/writer device 91 in response to the output request, the controller 100 determines whether there is waste liquid between each tag 95 and the reader/writer device 91 in the waste liquid collecting tank 82 or not. This determination allows the controller 100 to recognize the position of the boundary surface 87, and accordingly the controller 100 can accurately recognize the amount of waste liquid stored in the waste liquid collecting tank 82 stepwise. When a communication state between one of the tags 95 and the reader/writer device 91 has changed from an established state to a non-established state, the controller 100 recognizes and determines that the position of the boundary surface 87 has moved across the one of the tags 95.

Here, in the present embodiment, a tag 95$c$ located farthest from the supply opening 82$a$ in the direction of the movement of the boundary surface 87 is disposed at a position corresponding to a position of the boundary surface 87 where the amount of waste liquid stored in the waste liquid collecting tank 82 is equal to a replacement required amount. That is, the tag 95$c$ is disposed such that an amount of waste liquid stored in the waste liquid collecting tank 82 is equal to the replacement required amount when the communication state between the tag 95$c$ and the reader/writer device 91 has changed from the established state to the non-established state. It is noted that the replacement required amount is an amount of liquid which requires replacement of the waste liquid collecting tank 82.

Likewise, a tag 95$a$ is disposed at a position corresponding to a position of the boundary surface 87 where the amount of waste liquid stored in the waste liquid collecting tank 82 is equal to one third of the replacement required amount (hereinafter may be referred to as "small waste-liquid amount"). A tag 95$b$ is disposed at a position corresponding to a position of the boundary surface 87 where the amount of waste liquid stored in the waste liquid collecting tank 82 is equal to two thirds of the replacement required amount (hereinafter may be referred to as "medium waste-liquid amount").

There will be next explained the controller 100 with reference to FIG. 4. The controller 100 includes a central processing unit (CPU) 141, a read only memory (ROM) 142, a random access memory (RAM) 143, a network interface 144, and an internal clock 145. The controller 100 is electrically connected to various devices and components of the ink-jet printer 101.

The ROM 142 stores control programs for controlling the ink-jet printer 101. The RAM 143 is used as a working area where the control programs is read out or a storage area where data is temporarily stored. This RAM 143 has various storage areas which include an ink-specific first failure pattern storage area 143$a$, an ink-specific second failure pattern storage area 143$b$, a waste-liquid-specific first failure pattern storage area 143$c$, a waste-liquid-specific second failure pattern storage area 143$d$, an ink-specific communication state information storage area 143$e$, a waste-liquid-specific communication state information storage area 143$f$, an ink-amount storage area 143$g$, and a waste-liquid-amount storage area 143$h$.

The ink-specific communication state information storage area 143$e$ stores the communication state information representative of a current communication state between each tag 65 and the reader/writer device 61. The waste-liquid-specific communication state information storage area 143$f$ stores the communication state information representative of a current communication state between each tag 95 and the reader/writer device 91. The ink-amount storage area 143$g$ stores the current amount of ink stored in the sub-tank 51. The waste-liquid-amount storage area 143$h$ stores the current amount of waste liquid stored in the waste liquid collecting tank 82.

The network interface 144 is an interface for carrying out data communication with an external device such as a PC 150. The internal clock 145 outputs a signal to the CPU 141 at intervals of a predetermined length of time.

The CPU 141 executes various processings according to the control programs stored in the ROM 142. For example, the CPU 141 controls the head 1, the conveyor mechanism 20, and so on according to a print command transmitted from the PC 150 to perform the image recording operation for printing an image on the sheet P. In this image recording operation, the ink is supplied from the sub-tank 51 to the head 1 through the ink supply tube 47.

Also, the CPU 141 controls the ink transfer mechanism 40 to perform an ink replenishing operation for replenishing the temporary storage device 50 with the ink supplied from the cartridge 45. Specifically, the CPU 141 opens the valve 48 to switch the state of the valve 48 to the open state. As a result, the ink stored in the cartridge 45 is transferred through the ink supply tube 46 by its own weight and supplied from the inlet opening 52 to the sub-tank 51. This ink replenishing operation is started when the CPU 141 determines that the amount of ink stored in the sub-tank 51 is smaller than a small ink amount which will be described below and performed until the CPU 141 determines that the amount of ink stored in the sub-tank 51 reaches a large ink amount which will be described below.

Also, the CPU 141 controls the suction purging mechanism 70 to perform the above-described suction purging operation. Specifically, the CPU 141 moves the cap member 71 from the wait position to the maintenance position. The CPU 141 then drives the suction pump 73. As a result, the ink stored in the sub-tank 51 is supplied to the head 1 via the ink supply tube 47, and the ink is discharged from the ejection openings. The ink discharged from the ejection openings is transferred to the waste liquid collecting device 80 through the waste liquid tube 72 as waste liquid. It is noted that this suction purging operation is performed when the ink-jet printer 101 is turned on or every time when a predetermined length of time has passed.

Also, the CPU 141 executes an ink-amount determination processing for determining or recognizing the amount of ink stored in the sub-tank 51. Specifically, each time when a signal is supplied from the internal clock 145 to the CPU 141, the CPU 141 transmits the output request to the reader/writer device 61 of the ink-amount detection device 60 and obtains the communication state information from the reader/writer device 61. The CPU 141 then determines whether or not the obtained communication state information coincides with the communication state information stored in the ink-specific communication state information storage area 143$e$. When the obtained communication state information does not coincide with the communication state information stored in the ink-specific communication state information storage area 143$e$, the CPU 141 determines that the boundary surface 57 has moved across a certain tag 65 due to increase or decrease in the amount of ink stored in the sub-tank 51. The CPU 141 then determines based on the obtained communication state information whether the amount of ink stored in the sub-tank 51 is an amount smaller than the small ink amount, an amount equal to or larger than the small ink amount and smaller than the medium ink amount, an amount equal to or larger than the medium ink amount and smaller than the large ink amount, or an amount equal to or larger than the large ink amount.

Figure 5A:
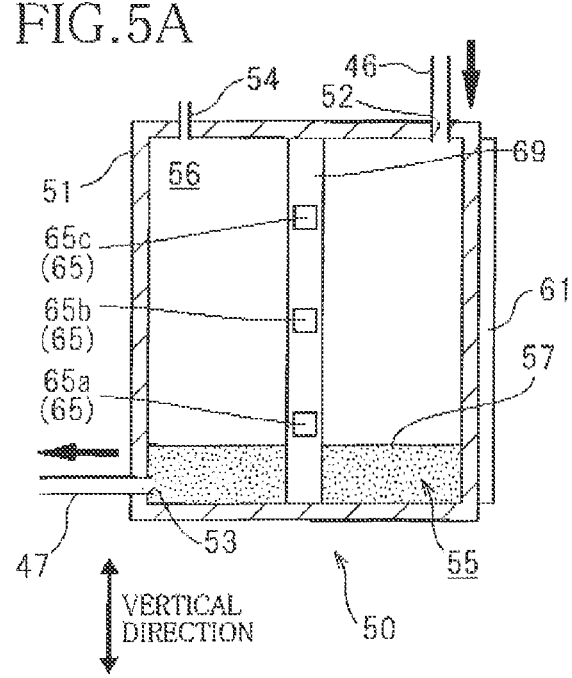
FIGS. 5A-5D are cross-sectional views for explaining a movement of a boundary surface between a stored area and a non-stored area in a sub-tank illustrated in FIG. 1.
Figure 5B:
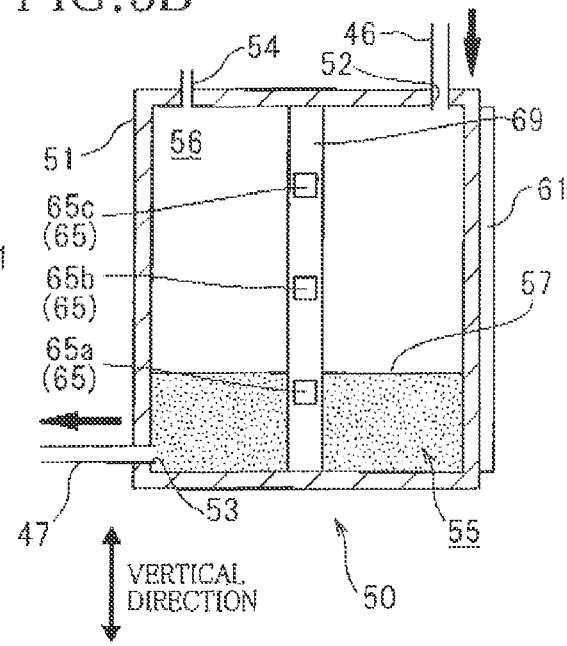
Figure 5C:
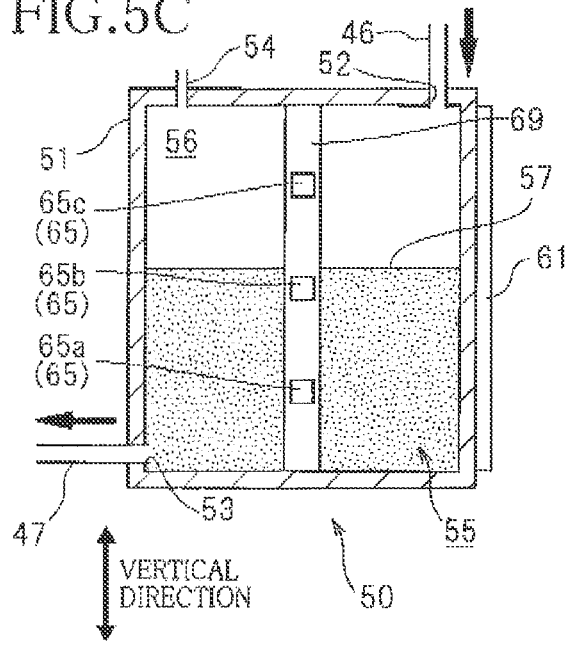
Figure 5D:
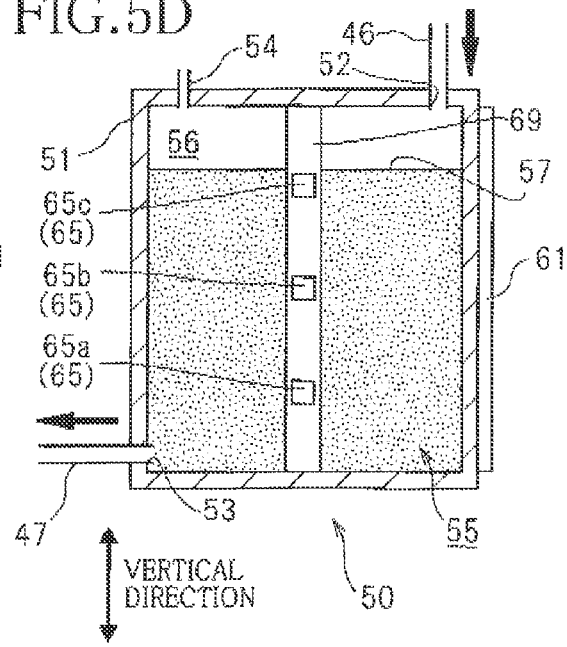

For example, when each of all the communication states between the three tags 65 and the reader/writer device 61 is the established state, the CPU 141 determines that as illustrated in FIG. 5A the boundary surface 57 is located below the tag 65$a$ in the vertical direction, and the amount of ink stored in the sub-tank 51 is smaller than the small ink amount. When only the communication state between the tag 65$a$ and the reader/writer device 61 is the non-established state, the CPU 141 determines that as illustrated in FIG. 5B the boundary surface 57 is located at the tag 65$a$ or above the tag 65$a$ in the vertical direction and below the tag 65$b$ in the vertical direction, and the amount of ink stored in the sub-tank 51 is equal to or larger than the small ink amount and smaller than the medium ink amount. When only the communication state between the tag 65c and the reader/writer device 61 is the established state, the CPU 141 determines that as illustrated in FIG. 5C the boundary surface 57 is located at the tag 65b or above the tag 65b in the vertical direction and below the tag 65c in the vertical direction, and the amount of ink stored in the sub-tank 51 is equal to or larger than the medium ink amount and smaller than the large ink amount. When each of all the communication states between the three tags 65 and the reader/writer device 61 is the non-established state, the CPU 141 determines that as illustrated in FIG. 5D the boundary surface 87 is located at the tag 65c or above the tag 65c in the vertical direction, and the amount of ink stored in the sub-tank 51 is equal to or larger than the large ink amount. After determining the amount of ink stored in the sub-tank 51 in these manners, the CPU 141 stores the amount of ink into the ink-amount storage area 143g.

Also, the CPU 141 executes a waste-liquid-amount determination processing for determining or recognizing the amount of waste liquid stored in the waste liquid collecting tank 82. Specifically, each time when a signal is supplied from the internal clock 145 to the CPU 141, the CPU 141 transmits the output request to the reader/writer device 91 of the waste-liquid-amount detection device 90 and obtains the communication state information from the reader/writer device 91. The CPU 141 then determines whether or not the obtained communication state information coincides with the communication state information stored in the waste-liquid-specific communication state information storage area 143f. When the obtained communication state information does not coincide with the communication state information stored in the waste-liquid-specific communication state information storage area 143f, the CPU 141 determines that the boundary surface 87 has moved across a certain tag 95 due to increase or decrease in the amount of waste liquid stored in the waste liquid collecting tank 82. The CPU 141 then determines based on the obtained communication state information whether the amount of waste liquid stored in the waste liquid collecting tank 82 is an amount smaller than the small waste-liquid amount (see FIG. 6A), an amount equal to or larger than the small waste-liquid amount and smaller than the medium waste-liquid amount (see FIG. 6B), an amount equal to or larger than the medium waste-liquid amount and smaller than the replacement required amount (see FIG. 6C), or an amount equal to or larger than the replacement required amount (see FIG. 6D).

After determining the amount of waste liquid stored in the waste liquid collecting tank 82, the CPU 141 stores the amount of waste liquid into the waste-liquid-amount storage area 143h. Also, the CPU 141 controls the touch panel 30 to display a screen indicating the amount of waste liquid which is stored in the waste-liquid-amount storage area 143h, allowing the user to recognize the amount of waste liquid stored in the waste liquid collecting tank 82. It is noted that also when the detection signal output from the tank presence sensor 84 is switched from a non-output state to an output state (that is, when the tank presence sensor 84 has detected a mount of the waste liquid collecting tank 82), the CPU 141 obtains the communication state information from the reader/writer device 91 of the waste-liquid-amount detection device 90 and determines the amount of waste liquid stored in the waste liquid collecting tank 82 based on the obtained communication state information to store the determined amount of waste liquid into the waste-liquid-amount storage area 143h.

Here, in a case where the position of the boundary surface 87 is located, for example, at a certain tag 95, the intensity of the radio wave transmitted from the certain tag 95 and received by the reader/writer device 91 may change even though the amount of waste liquid stored in the waste liquid collecting tank 82 has not changed. This may change the present or absence of establishment of short distance wireless communication between the certain tag 95 and the reader/writer device 91, resulting in erroneous determination of the amount of waste liquid stored in the waste liquid collecting tank 82 by the CPU 141. As a result, even though the amount of waste liquid stored in the waste liquid collecting tank 82 has not changed, information contained in the screen to be displayed on the touch panel 30 changes, leading to a problem that the user may mistakenly believe that an error such as a leakage of waste liquid from the waste liquid collecting tank 82 is caused. To solve this problem, in the present embodiment, when the communication state between the certain tag 95 and the reader/writer device 91 has changed to the non-established state in a case where the amount of waste liquid stored in the waste liquid collecting tank 82 increases monotonously or does not change, the CPU 141 determines that the position of the boundary surface 87 is located at the position corresponding to the certain tag 95 even if the communication state thereafter changes to the established state.

Also, the CPU 141 executes an ink-tag failure determination processing for determining whether there is any failure in the tags 65 of the ink-amount detection device 60 or not and a waste-liquid-tag failure determination processing for determining whether there is any failure in the tags 95 of the waste-liquid-amount detection device 90 or not. In the ink-tag failure determination processing, specifically, each time when the communication state information is received from the ink-amount detection device 60, the CPU 141 refers to the ink-specific first failure pattern storage area 143a and the ink-specific second failure pattern storage area 143b to determine based on the obtained communication state information whether there is any failure in the tags 65 or not. In the waste-liquid-tag failure determination processing, likewise, each time when the communication state information is received from the waste-liquid-amount detection device 90, the CPU 141 refers to the waste-liquid-specific first failure pattern storage area 143c and the waste-liquid-specific second failure pattern storage area 143d to determine based on the communication state information whether there is any failure in the tags 95 or not.

There will be next explained, with reference to FIGS. 7A-7G the ink-specific first failure pattern storage area 143a, the ink-specific second failure pattern storage area 143b, the waste-liquid-specific first failure pattern storage area 143c, and the waste-liquid-specific second failure pattern storage area 143d. It is noted that the tag 65a, the tag 65b, and the tag 65c are respectively expressed as "TAG A", "TAG B", and "TAG C" in FIGS. 7A-7G. Also, "○" represents the established state of the communication state between the tag 65 and the reader/writer device 61, and "x" represents the non-established state of the communication state between the tag 65 and the reader/writer device 61.

The ink-specific first failure pattern storage area 143a stores a plurality of failure patterns for detecting a failure in the tags 65b, 65c using the communication state between each tag 65 and the reader/writer device 61. Here, the height level of the ink stored in the sub-tank 51 (i.e., the position of the boundary surface 57 in the vertical direction) rises with supply of the ink from the inlet opening 52 and falls with discharge of the ink from the output opening 53. Accordingly, when all the three tags 65 are normal and when a communication state between a certain tag 65 and the reader/writer device 61 is the established state, the communication state between the reader/writer device 61 and each tag 65 disposed above the certain tag 65 in the vertical direction is never the non-established state. In this case, the CPU 141 can determine that there is a failure in each tag 65 disposed above the certain tag 65 in the vertical direction.

Figure 7A:
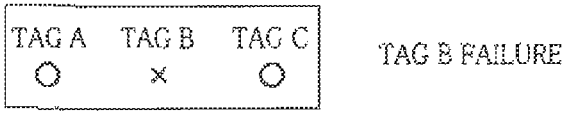
FIGS. 7A-7G are views for explaining an ink-specific first failure pattern storage area, an ink-specific second failure pattern storage area, a waste-liquid-specific first failure pattern storage area, and a waste-liquid-specific second failure pattern storage area.
Figure 7B:
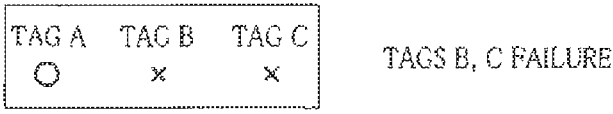
Figure 7C:
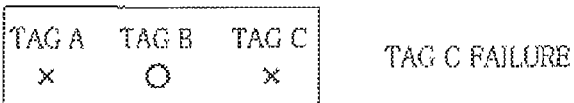
Figure 7D:
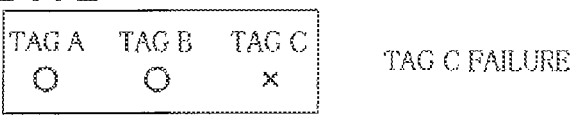

As illustrated in FIGS. 7A and 7B, the ink-specific first failure pattern storage area 143a stores a pattern indicating that the communication state between the tag 65a and the reader/writer device 61 is the established state and that the communication state between the tag 65b and the reader/writer device 61 is the non-established state, as a failure pattern corresponding to a failure of the tag 65b. Also, as illustrated in FIGS. 7C and 7D, the ink-specific first failure pattern storage area 143a stores a pattern indicating that the communication state between at least one of the tags 65a, 65b and the reader/writer device 61 is the established state and that the communication state between the tag 65c and the reader/writer device 61 is the non-established state, as a failure pattern corresponding to a failure of the tag 65c.

With supply of the waste liquid from the supply opening 82a, the boundary surface 87 moves in the direction away from the supply opening 82a in the direction in which the waste liquid permeates in the waste liquid collecting tank 82. Thus, when all the three tags 95 are normal and when the communication state between a certain tag 95 and the reader/writer device 91 is the established state, a communication state between the reader/writer device 91 and each tag 95 disposed farther from the supply opening 82a than the certain tag 95 in the direction in which the waste liquid permeates is never the non-established state. Like the ink-specific first failure pattern storage area 143a, the waste-liquid-specific first failure pattern storage area 143c stores a plurality of failure patterns for detecting a failure in the tags 95b, 95c using the communication state between each tag 95 and the reader/writer device 91.

When the pattern of the communication state between each tag 65 and the reader/writer device 61 coincides with any of the failure patterns stored in the ink-specific first failure pattern storage area 143a, the CPU 141 determines that there is a failure in a tag or tags 65 corresponding to the failure pattern coinciding with the pattern of the communication state. Likewise, when the pattern of the communication state between each tag 95 and the reader/writer device 91 coincides with any of the failure patterns stored in the waste-liquid-specific first failure pattern storage area 143c, the CPU 141 determines that there is a failure in a tag or tags 95 corresponding to the failure pattern coinciding with the pattern of the communication state.

The ink-specific second failure pattern storage area 143b stores a plurality of failure patterns for detecting a failure in the tags 65b, 65c using a transition or a change of the communication state between each tag 65 and the reader/writer device 61. Here, in the present embodiment, the time intervals at which signals are output from the internal clock 145 are set such that, in each of the time intervals in the ink replenishing operation, an amount of ink supplied from the inlet opening 52 to the sub-tank 51 to replenish the sub-tank 51 is smaller than any of (i) an amount obtained by subtracting the small ink amount from the medium ink amount and (ii) an amount obtained by subtracting the medium ink amount from the large ink amount. Accordingly, when the three tags 65 are normal, the communication states between two or more of the tags 65 and the reader/writer device 61 never change from the established state to the non-established state at the same time in the state transition of the communication state between each tag 65 and the reader/writer device 61 based on the communication state information obtained successively from the ink-amount detection device 60. Therefore, when the communication states between two or more of the tags 65 and the reader/writer device 61 have changed from the established state to the non-established state at the same time, the CPU 141 can determine that there is a failure in the tags 65 other than the tag 65 disposed at the lowermost position in the vertical direction among the tags 65 whose communication states with the reader/writer device 61 have changed.

Figure 7E:
Figure 7F:
Figure 7G:

As illustrated in FIGS. 7E and 7F, the ink-specific second failure pattern storage area 143b stores a pattern of a state transition made from a state in which the communication state between each tag 65 and the reader/writer device 61 is the established state to a state in which the communication state between the tag 65b and the reader/writer device 61 is the non-established state, as a failure pattern corresponding to a failure of the tag 65b. Also, as illustrated in FIGS. 7F and 74 the ink-specific second failure pattern storage area 143b stores a pattern of a state transition made from a state in which the communication state between at least one of the tags 65a, 65b and the reader/writer device 61 is the established state to a state in which the communication state between the tag 65c and the reader/writer device 61 is the non-established state, as a failure pattern corresponding to a failure of the tag 65c.

In the present embodiment, the time intervals at which signals are output from the internal clock 145 are set such that, in each of the time intervals in the suction purging operation, an amount of waste liquid supplied from the supply opening 82a into the waste liquid collecting tank 82 is smaller than one third of the replacement required amount. Accordingly, when the three tags 95 are normal, the communication states between two or more of the tags 95 and the reader/writer device 91 never change from the established state to the non-established state at the same time in the state transition of the communication state between each tag 95 and the reader/writer device 91 based on the communication state information obtained successively from the waste-liquid-amount detection device 90. Like the ink-specific second failure pattern storage area 143b, the waste-liquid-specific second failure pattern storage area 143d stores a plurality of failure patterns for detecting a failure in the tags 95b, 95e using the state transition of the communication state between each tag 95 and the reader/writer device 91.

When the communication state between each tag 65 and the reader/writer device 61 has changed and when a pattern of the state transition of the communication state coincides with any of the failure patterns stored in the ink-specific second failure pattern storage area 143b, the CPU 141 determines that there is a failure in the tag or tags 65 corresponding to the failure pattern coinciding with the pattern of the state transition. Likewise, when the communication state between each tag 95 and the reader/writer device 91 has changed and when the pattern of the state transition coincides with any of the failure patterns stored in the waste-liquid-specific second failure pattern storage area 143d, the CPU 141 determines that there is a failure in the tag or tags 95 corresponding to the failure pattern coinciding with the pattern of the state transition.

Incidentally, since the amount of ink stored in the sub-tank 51 increases while the ink replenishing operation is being performed, the communication state between each tag 65 and the reader/writer device 61 never changes from the established state to the non-established state when the ink replenishing operation is not being performed in the case where the tags 65 are normal. Accordingly, in a case where there is any tag 65 whose communication state with the reader/writer device 61 has changed from the established state to the non-established state when the ink replenishing operation is not being performed, the CPU 141 determines that there is a failure in the tag 65.

Also, since the amount of ink stored in the sub-tank 51 decreases while any of the image recording operation and the suction purging operation is being performed, the communication state between each tag 65 and the reader/writer device 61 never changes from the non-established state to the established state when these operations are not being performed in the case where the tags 65 are normal. Accordingly, in a case where there is any tag 65 whose communication state with the reader/writer device 61 has changed from the non-established state to the established state when neither the image recording operation nor the suction purging operation is being performed, the CPU 141 determines that there is a leakage of ink from the sub-tank 51 to the outside.

Also, the amount of waste liquid stored in the waste liquid collecting tank 82 increases only while the suction purging operation is being performed and until a predetermined length of time passes from the suction purging operation performed most recently. Accordingly, in the case where the tags 95 are normal, when the suction purging operation is not being performed currently and when the predetermined length of time has passed from the suction purging operation performed most recently, the communication state between each tag 95 and the reader/writer device 91 never changes from the established state to the non-established state. Accordingly, in a case where there is any tag 95 whose communication state with the reader/writer device 91 has changed from the established state to the non-established state when the suction purging operation is not being performed currently and when the predetermined length of time has passed from the suction purging operation performed most recently, the CPU 141 determines that there is a failure in the tag 95. Here, the predetermined length of time is a time required for the waste liquid discharged from the ejection openings into the cap member 71 by the suction purging operation to be collected into the waste liquid collecting tank 82 through the waste liquid tube 72.

Figure 8:
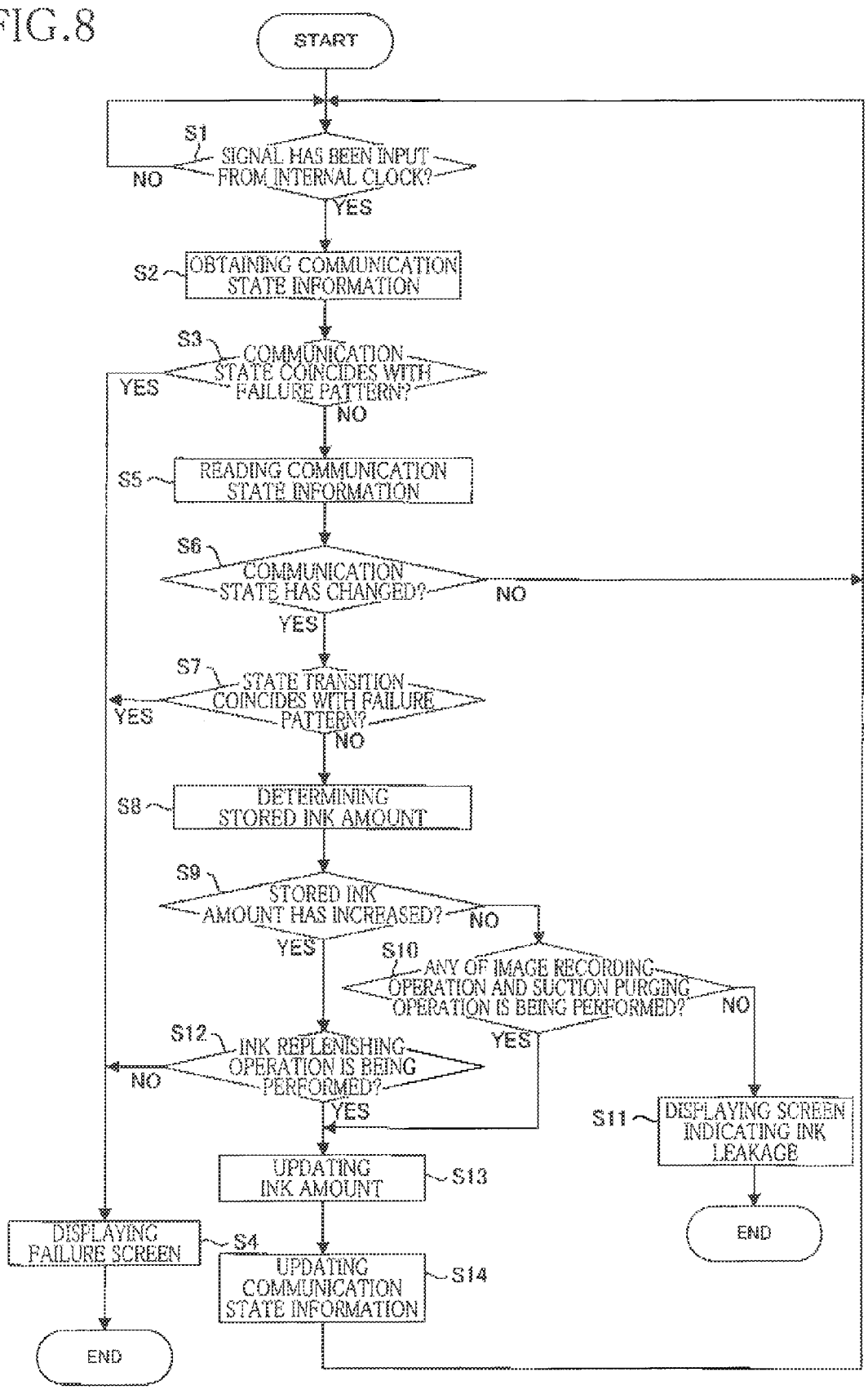
FIG. 8 is a flow chart illustrating an ink-amount determination processing and an ink-tag failure determination processing to be executed by a controller illustrated in FIG. 1.

There will be next explained one example of the ink-amount determination processing and the ink-tag failure determination processing to be executed by the CPU 141 with reference to FIG. 8. This flow begins with S1 at which the CPU 141 determines whether a signal has been input from the internal clock 145 or not. When no signal is input from the internal clock 145 (S1: NO), the CPU 141 repeats the processing at S1. On the other hand, when a signal is input from the internal clock 145 (S1: YES), the CPU 141 at S2 transmits the output request to the reader/writer device 61 of the ink-amount detection device 60 and obtains the communication state information responsive to the output request from the reader/writer device 61.

The CPU 141 at S3 determines whether the pattern of the communication state between each tag 65 and the reader/writer device 61 which is indicated by the communication state information obtained from the reader/writer device 61 coincides with any of the failure patterns stored in the ink-specific first failure pattern storage area 143a or not. When the pattern of the communication state coincides with any of the failure patterns (S3: YES), the CPU 141 at S4 controls the touch panel 30 to display a screen indicating a failure in the tag or tags 65 corresponding to the failure pattern coinciding with the pattern of the communication state, and this flow ends.

On the other hand, when the pattern of the communication state does not coincide with any of the failure patterns (S3: NO), the CPU 141 at S5 reads the communication state information stored in the ink-specific communication state information storage area 143e. The CPU 141 at S6 determines whether this read communication state information coincides with the communication state information obtained at S2 or not to determine whether the communication state between each tag 65 and the reader/writer device 61 has changed or not. When the communication state has not changed (S6: NO), the CPU 141 determines that the amount of ink stored in the sub-tank 51 does not change, and this flow returns to S1.

On the other hand, when the communication state has changed (S6: YES), the CPU 141 at S7 determines whether the pattern of the state transition of the communication state coincides with any of the failure patterns stored in the ink-specific second failure pattern storage area 143b or not. When the pattern of the state transition coincides with any of the failure patterns (S7: YES), the CPU 141 at S4 controls the touch panel 30 to display a screen indicating a failure in the tag or tags 65 corresponding to the failure pattern coinciding with the pattern of the state transition, and this flow ends.

On the other hand, when the pattern of the state transition does not coincide with any of the failure patterns (S7: NO), the CPU 141 at S8 determines or detects the amount of ink stored in the sub-tank 51 based on the communication state between each tag 65 and the reader/writer device 61 which is indicated by the communication state information obtained at S2. The CPU 141 at S9 determines whether the determined amount of ink is larger than the amount of ink stored in the ink-amount storage area 143g or not to determine whether the amount of ink stored in the sub-tank 51 has increased or not.

When the amount of ink stored in the sub-tank 51 has not increased (S9: NO), the CPU 141 determines that the amount of ink stored in the sub-tank 51 has decreased and at S10 determines whether any of the image recording operation and the suction purging operation is being performed or not. When any of the image recording operation and the suction purging operation is not being performed (S10: NO), the CPU 141 determines that there is a leakage of the ink from the sub-tank 51 to the outside and controls at S11 the touch panel 30 to display a screen indicating the leakage of ink, and this flow ends. On the other hand, when any of the image recording operation and the suction purging operation is being performed (S10: YES), this flow goes to S13.

When the CPU 141 at S9 determines that the amount of ink stored in the sub-tank 51 has increased (S9: YES), the CPU 141 at S12 determines whether the ink replenishing operation is being performed or not. When the ink replenishing operation is being performed (S12: YES), this flow goes to S13.

On the other hand, when the ink replenishing operation is not being performed (S12: NO), the CPU 141 determines that there is a failure in the tag or tags 65 whose communication state with the reader/writer device 61 has changed from the established state to the non-established state and at S4 controls the touch panel 30 to display a screen indicating the failure of the tag or tags 65, and this flow ends.

At S13, the CPU 141 updates the amount stored in the ink-amount storage area 143g to the ink amount determined at S8. The CPU 141 at S14 updates the communication state information stored in the ink-specific communication state information storage area 143e to the communication state information obtained at S2, and this flow returns to S1.

Figure 9:
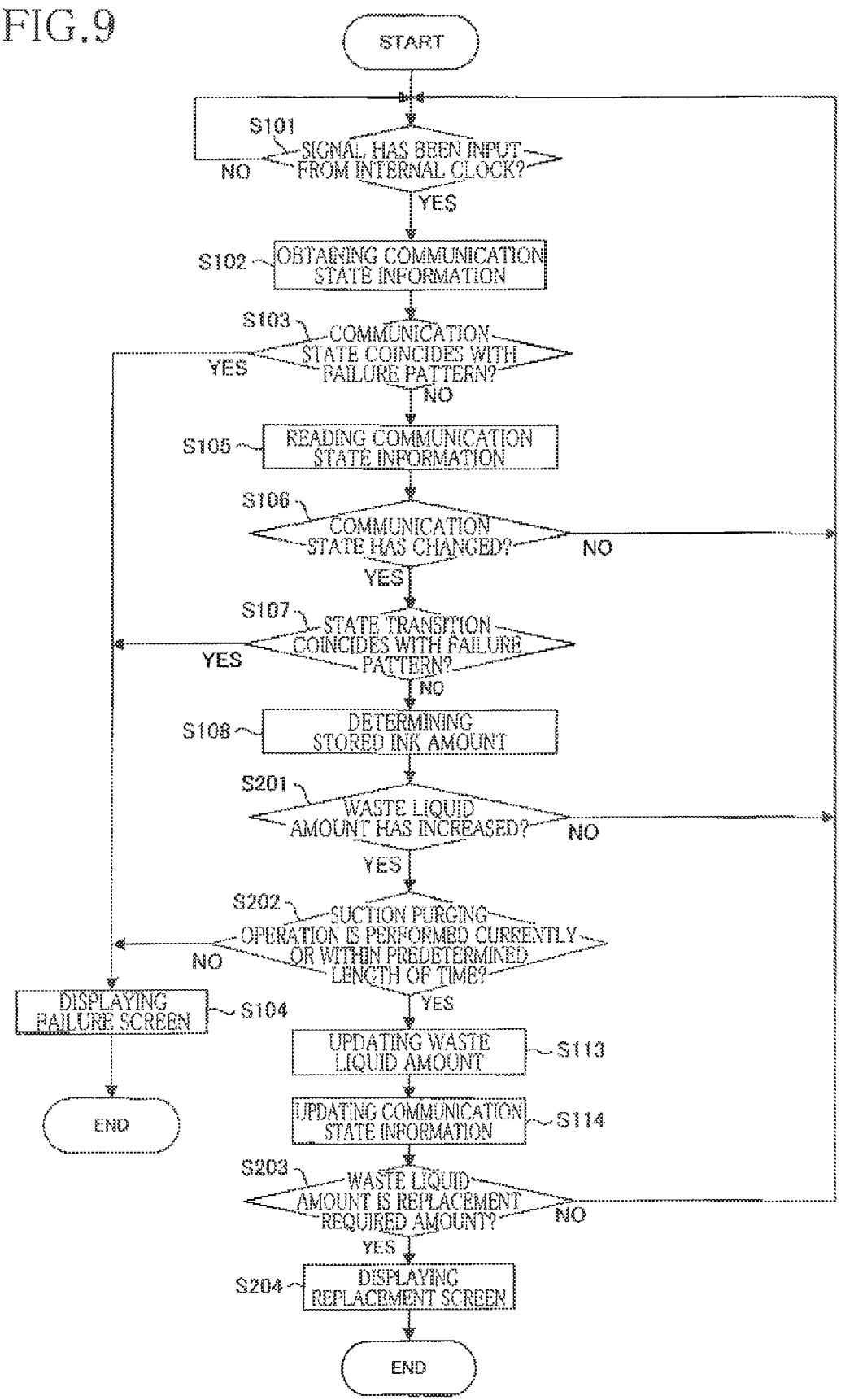
FIG. 9 is a flow chart illustrating a waste-liquid-amount determination processing and a waste-liquid-tag failure determination processing to be executed by the controller illustrated in FIG. 1.

There will be next explained one example of the waste-liquid-amount determination processing and the waste-liquid-tag failure determination processing to be executed by the CPU 141 with reference to FIG. 9. It is assumed that the waste liquid collecting tank 82 is being mounted on the tank holder 81. Also, some processings of the waste-liquid-amount determination processing and the waste-liquid-tag failure determination processing are processings which correspond to those of the ink-amount determination processing and the ink-tag failure determination processing and in which the temporary storage device 50 is replaced with the waste liquid collecting device 80, the ink-amount detection device 60 with the waste-liquid-amount detection device 90, the ink-specific first failure pattern storage area 143a with the waste-liquid-specific first failure pattern storage area 143c, the ink-specific second failure pattern storage area 143b with the waste-liquid-specific second failure pattern storage area 143d, the ink-specific communication state information storage area 143e with the waste-liquid-specific communication state information storage area 143f, and the ink-amount storage area 143g with the waste-liquid-amount storage area 143h. Thus, the numbers representative of steps which are obtained by adding one hundred to the numbers representative of steps in the ink-amount determination processing and the ink-tag failure determination processing are used to designate the corresponding processings of the waste-liquid-amount determination processing and the waste-liquid-tag failure determination processing, and an explanation of which is dispensed with.

At S108, the CPU 141 determines or detects the amount of waste liquid stored in the waste liquid collecting tank 82 based on the communication state between each tag 95 and the reader/writer device 91 which is indicated by the communication state information obtained at S102. The CPU 141 at S201 determines whether the determined amount of waste liquid is larger than the amount of waste liquid which is stored in the waste-liquid-specific communication state information storage area 143f or not to determine whether the amount of waste liquid stored in the waste liquid collecting tank 82 has increased or not.

When the amount of waste liquid has not increased (S201: NO), the CPU 141 determines that the amount of waste liquid stored in the waste liquid collecting tank 82 has not changed, and this flow returns to S101 without any update of the information stored in the waste-liquid-specific communication state information storage area 143f and the waste-liquid-amount storage area 143h.

On the other hand, when the amount of waste liquid has increased (S201: YES), the CPU 141 at S202 determines whether the predetermined length of time has passed from the most recent suction purging operation or not and whether the suction purging operation is being performed or not. When equal to or longer than the predetermined length of time has passed from the most recent suction purging operation and when the suction purging operation is not being performed (S202: NO), the CPU 141 determines that there is a failure in the tag or tags 95 whose communication state with the reader/writer device 91 has changed from the established state to the non-established state and at S104 controls the touch panel 30 to display a screen indicating the failure in the tag or tags 95, and this flow ends.

On the other hand, when the purging operation is performed currently or within the most recent suction purging operation (S202: YES), this flow goes to S113, S114, and S203. The CPU 141 at S203 determines whether the amount of waste liquid which is updated at S113 is equal to the replacement required amount or not. When the amount of waste liquid which is updated at S113 is not equal to the replacement required amount (S203: NO), this flow returns to S101. On the other hand, when the amount of waste liquid which is updated at S113 is equal to the replacement required amount (S203: YES), the CPU 141 at S204 controls the touch panel 30 to display a screen prompting for replacement of the waste liquid collecting tank 82, and this flow ends.

In view of the above, in the ink-jet printer 101 according to the present embodiment, when the position of the boundary surface 57 is moved to a position corresponding to a certain tag 65 in the sub-tank 51, the ink stored in the sub-tank 51 inhibits establishment of short distance wireless communication between the certain tag 65 and the reader/writer device 61. Accordingly, the position of the boundary surface 57 can be accurately recognized stepwise based on the presence or absence of the establishment of the short distance wireless communication between each tag 65 and the reader/writer device 61. As a result, the amount of ink stored in the sub-tank 51 can be accurately recognized stepwise. Likewise, the controller 100 can accurately recognize the amount of waste liquid stored in the waste liquid collecting tank 82 stepwise based on the presence or absence of the establishment of the short distance wireless communication between each tag 95 and the reader/writer device 91.

The radio wave transferred between each tag 65 and the reader/writer device 61 in the ink-amount detection device 60 is a microwave which is easily absorbed into liquid having a polarity. Accordingly, the intensity of the radio wave transmitted from each tag 65 and received by the reader/writer device 61 differs greatly between a case where there is ink between the tags 65 and the reader/writer device 61 and a case where there is no ink between the tags 65 and the reader/writer device 61, allowing the controller 100 to more accurately recognize the amount of ink stored in the sub-tank 51. In the waste-liquid-amount detection device 90, likewise, a microwave is used for a radio wave transferred between each tag 95 and the reader/writer device 91, allowing the controller 100 to more accurately recognize the amount of waste liquid stored in the waste liquid collecting tank 82.

Since the three tags 65 of the ink-amount detection device 6 are disposed in the sub-tank 51, when the boundary surface 57 is located above the height level of the tag 65 in the vertical direction, the tag 65 is surrounded with the ink. Accordingly, the radio wave transmitted from the tag 65 to the reader/writer device 61 inevitably passes through the ink, thereby reliably lowering the intensity of the radio wave transmitted from the tag 65 and received by the reader/writer device 61. As a result, the controller 100 can more accurately recognize the amount of ink stored in the sub-tank 51. In the waste-liquid-amount detection device 90, likewise, since the three tags 95 are disposed in the ink absorber 83 accommodated in the waste liquid collecting tank 82, when the boundary surface 87 is located above the height level of the tag 95 in the vertical direction, the tag 95 is surrounded with the waste liquid. As a result, the controller 100 can more accurately recognize the amount of waste liquid stored in the waste liquid collecting tank 82.

Also, since the three tags 65 of the ink-amount detection device 60 are disposed in the sub-tank 51 such that a space for the ink is formed between each tag 65 and the reader/writer device 61, the detection can be performed not at a portion of the boundary surface 57 which contacts the inner wall of the sub-tank 51 but at a central portion of the boundary surface 57 which is spaced apart from the inner wall. Accordingly, the state of the ink in the sub-tank 51 can be accurately detected when compared with a case where an optical sensor provided outside the sub-tank 51 is used to detect a portion of the boundary surface 57 which contacts the inner wall of the sub-tank 51.

The controller 100 can determine whether or not the pattern of the communication state between each tag 65 and the reader/writer device 61 coincides with any of the failure patterns stored in the ink-specific first failure pattern storage area 143a in the ink-amount detection device 60 to determine whether there is any failure in the tags 65 or not. Also, the controller 100 can determine whether or not the pattern of the state transition of the communication state between each tag 65 and the reader/writer device 61 coincides with any of the failure patterns stored in the ink-specific second failure pattern storage area 143b to determine whether there is any failure in the tags 65 or not. Likewise, the controller 100 can use the waste-liquid-specific first failure pattern storage area 143c and the waste-liquid-specific second failure pattern storage area 143d to determine whether there is any failure in the tags 95 of the waste-liquid-amount detection device 90 or not.

While the embodiment of the present invention has been described above, it is to be understood that the invention is not limited to the details of the illustrated embodiment, but may be embodied with various changes and modifications, which may occur to those skilled in the art, without departing from the spirit and scope of the invention. For example, while the response signal superposed on the radio wave transmitted from each tag 65 to the reader/writer device 61 contains the identification information of the tag 65 in the ink-amount detection device 60 in the above-described embodiment, the response signal may not contain the identification information. In this case, the amount of ink stored in the sub-tank 51 may be determined based on the number of response signals transmitted from the tags 65 and received by the reader/writer device 61. For example, in a case where two response signals are received by the reader/writer device 61, the controller determines that no response signal is received from the tag 65a, and response signals are received from the tags 65b, 65c, and accordingly the boundary surface 57 is located at the tag 65a or a position above the tag 65a and below the tag 65b in the vertical direction. Therefore, the controller can determine that the amount of ink stored in the sub-tank 51 is equal to or larger than the small ink amount and smaller than the medium ink amount. Likewise, the response signal superposed on the radio wave transmitted from each tag 95 to the reader/writer device 91 in the waste-liquid-amount detection device 90 may not contain the identification information of the tag 95.

While one reader/writer device is provided for each of the ink-amount detection device 60 and the waste-liquid-amount detection device 90 in the above-described embodiment, the ink-amount detection device 60 and the waste-liquid-amount detection device 90 may share one reader/writer device. In this case, this shared reader/writer device transmits and receives radio waves between the tags 65 disposed in the sub-tank 51 and the tags 95 disposed in the waste liquid collecting tank 82.

The ink-amount detection device 60 may include a plurality of reader/writer devices 61. For example, the ink-amount detection device 60 may include three reader/writer devices 61 respectively corresponding to the three tags 65, and each of these three reader/writer devices 61 may transfer a radio wave only with a corresponding one of the tags 65. Likewise, the waste-liquid-amount detection device 90 may include a plurality of reader/writer devices 91.

In the above-described embodiment, the first communication device is each tag 65 (or each tag 95), and the second communication device is the reader/writer device 61 (or the reader/writer device 61). However, other devices may be used as the first communication device and the second communication device as long as these devices may carry out short distance wireless communication therebetween. For example, the first communication device may be what is called an active RFID tag including an electric power unit such as a battery and using electric power generated by the electric power to transmit a radio wave to the reader/writer device 61 (or the reader/writer device 91). Also, while the number of the tags 65 (the tags 95) is three in the above-described embodiment, any number of tags may be used as long as the number is two or more. For example, four or more tags may be used. This configuration allows more accurate detection of the position of the boundary surface 57 (or the boundary surface 87). While the tags 65 (the tags 95) are arranged in a row in the direction of the movement of the boundary surface 57 (the boundary surface 87) in the above-described embodiment, the tags may be arranged in two or more rows spaced apart from each other. This configuration allows more accurate determination of the states of the boundary surfaces in the sub-tank 51 and the waste liquid collecting tank 82, resulting in improved accuracy of detecting the amount of ink and the amount of waste liquid. In particular, in the case of the waste liquid collecting tank (the storage chamber) 82 filled with the ink absorber 83 in which the boundary surface 87 does not expand evenly in a direction parallel to the row of the tags, the accuracy of detection is improved more effectively.

Figure 10:
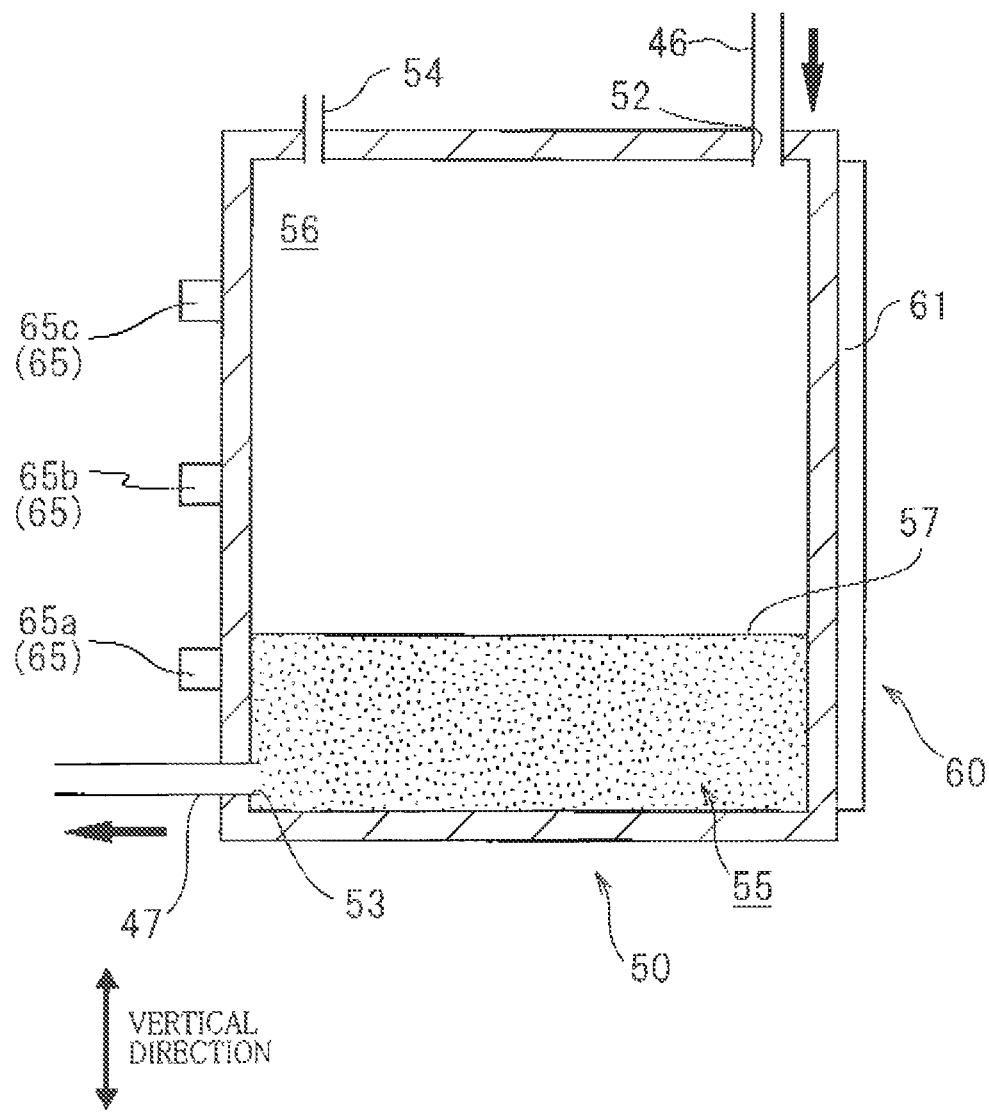
FIG. 10 is a cross-sectional view schematically illustrating a temporary storage device according to a modification.

While the three tags 65 are disposed in the sub-tank 51 in the above-described embodiment, the present invention is not limited to this configuration. That is, any configuration may be employed as long as at least a portion of the sub-tank 51 is interposed between the three tags 65 and the reader/writer device 61. For example, as illustrated in FIG. 10, the three tags 65 may be provided on an outer face of a side wall of the sub-tank 51 which is opposite the outer face of the side wall thereof on which the reader/writer device 61 is provided. In this configuration, even when the boundary surface 57 is located above the tag 65 in the vertical direction, the tag 65 is not surrounded with ink unlike the above-described embodiment. Accordingly, the antenna 67 of the tag 65 is preferably shaped such that a radio wave transmitted from the tag 65 does not reach the reader/writer device 61 through paths other than a path extending through the sub-tank 51, for example. Likewise, the three tags 95 may not be disposed in the waste liquid collecting tank 82.

In the above-described embodiment, the intensity of the radio wave transmitted from the reader/writer device 61 to the certain tag 65 is set such that the intensity of the radio wave transmitted from the certain tag 65 and received by the reader/writer device 61 is the smallest intensity which allows establishment of a short distance wireless communication therebetween in the state in which there is no ink between the reader/writer device 61 and the certain tag 65. However, the present invention is not limited to this configuration as long as the intensity of the radio wave transmitted from the certain tag 65 and received by the reader/writer device 61 allows establishment of the short distance wireless communication in the state in which there is no ink between the reader/writer device 61 and the certain tag 65. For example, the controller 100 may be configured such that when the intensity of the radio wave transmitted from the certain tag 65 and received by the reader/writer device 61 is equal to or greater than a predetermined value, the controller 100 determines that the boundary surface 57 is located at the position of the certain tag 65 or above the certain tag 65 in the vertical direction and such that when the intensity of the radio wave transmitted from the certain tag 65 and received by the reader/writer device 61 is less than the predetermined value, the controller 100 determines that the boundary surface 57 is located below the certain tag 65 in the vertical direction.

In the above-described embodiment, the CPU 141 executes the ink-amount determination processing and the waste-liquid-amount determination processing each time when a signal output from the internal clock 145 is received, but the CPU 141 may execute these processings at all times.

The processings are executed by the single CPU in the above-described embodiment but may be executed by a plurality of CPUs, an application-specific integrated circuit (ASIC), or a combination of the CPU(s) and the ASIC.

While the solvent of the ink is water in the above-described embodiment, any solvent may be used as long as the solvent has a polarity. For example, the solvent of the ink may be ethanol. The present invention may be applied to a liquid storage device for storing liquid having a polarity other than the ink.

What is claimed is:

1. A liquid storage device, comprising:
a liquid storage formed with a storage chamber for storing liquid;
a plurality of first communication devices each configured to transmit a radio wave for carrying out short distance wireless communication;
a second communication device configured to receive the radio wave transmitted from each of the plurality of first communication devices; and
a controller;
wherein the plurality of first communication devices being arranged in a configuration corresponding to a direction of a movement of a boundary surface between a stored area where the liquid is stored in the storage chamber and a non-stored area where the liquid is not stored in the storage chamber, the movement being caused by one of an increase and a decrease of an amount of the liquid stored in the storage chamber, a portion of the storage chamber being interposed between the second communication device and each of the plurality of first communication devices;
wherein the controller being configured to detect a position of the boundary surface based on a reception status of the radio wave transmitted from each of the plurality of first communication devices and received by the second communication device;
wherein the liquid storage device further comprises a storage configured to store a failure pattern representative of a failure that relates to a transition of a communication state of at least one first communication device of the plurality of first communication devices, the failure pattern being indicative of transition of the reception status of the radio wave transmitted from each of the plurality of first communication devices and received by the second communication device; and
wherein the controller is configured to detect that there is a failure in at least one of the plurality of first communication devices which has transmitted the radio wave containing the failure pattern, when the transition of the reception status of the radio wave transmitted from each of the plurality of first communication devices and received by the second communication device contains the failure pattern stored in the storage.

2. The liquid storage device according to claim 1;
wherein the liquid to be stored in the storage chamber is polar liquid.

3. The liquid storage device according to claim 1;
wherein the second communication device is configured to transmit a radio wave to each of the plurality of first communication devices; and
wherein each of the plurality of first communication devices is configured to transmit the radio wave for carrying out the short distance wireless communication to the second communication device in response to the radio wave transmitted from the second communication device.

4. The liquid storage device according to claim 1;
wherein the plurality of first communication devices are respectively assigned with a plurality of identification information sets which are different from each other; and
wherein each of the plurality of first communication devices is configured to transmit the radio wave containing a corresponding one of the plurality of identification information sets to the second communication device.

5. The liquid storage device according to claim 1;
wherein the plurality of first communication devices are respectively arranged at different positions from each other in the direction of the movement of the boundary surface.

6. The liquid storage device according to claim 1;
wherein the radio wave is a microwave.

7. The liquid storage device according to claim 1;
wherein each of the plurality of first communication devices is disposed in the storage chamber.

8. The liquid storage device according to claim 7, further comprising:
a supply opening through which the liquid is supplied to the storage chamber; and
a liquid absorber accommodated in the storage chamber to absorb the liquid;
wherein each of the plurality of first communication devices is disposed in the liquid absorber along a direction in which the liquid supplied from the supply opening permeates through the liquid absorber.

9. The liquid storage device according to claim 1;
wherein the controller is configured to detect that the position of the boundary surface passes across one first communication device of the plurality of first communication devices along the direction of the movement of the boundary surface, when an intensity of a radio wave transmitted from the one first communication device changes from a value equal to or greater than a first value to a value less than the first value or from the value less than the first value to the value equal to or greater than the first value.

10. The liquid storage device according to claim 1;
wherein the controller is configured to detect that the position of the boundary surface is located at a position corresponding to one first communication device of the plurality of first communication devices, even when an intensity of a radio wave transmitted from the one first communication device to the second communication device in the short distance wireless communication becomes equal to or greater than a first value after the intensity of the radio wave transmitted in the short distance wireless communication between the one first communication device and the second communication device changes from an intensity equal to or greater than the first value to an intensity less than the first value in one of a situation in which the amount of the liquid stored in the storage chamber increases monotonously and a situation in which the amount of the liquid stored in the storage chamber does not change.

11. A liquid storage device, comprising:
a liquid storage formed with a storage chamber for storing liquid;
a plurality of first communication devices each configured to carry out short distance wireless communication;
a second communication device configured to carry out short distance wireless communication with the plurality of first communication devices; and
a controller;

wherein the plurality of first communication devices being arranged in a configuration corresponding to a direction of a movement of a boundary surface between a stored area where the liquid is stored in the storage chamber and a non-stored area where the liquid is not stored in the storage chamber, the movement being caused by one of an increase and a decrease of an amount of the liquid stored in the storage chamber, a portion of the storage chamber being interposed between the second communication device and each of the plurality of first communication devices;

wherein the controller being configured to detect a position of the boundary surface based on a state of establishment of the short distance wireless communication between each of the plurality of first communication devices and the second communication device;

wherein the liquid storage device further comprises a storage configured to store a failure pattern representative of a failure that relates to a transition of a communication state of at least one first communication device of the plurality of first communication devices, the failure pattern being indicative of transition of the status of the establishment of the short distance wireless communication between each of the plurality of first communication device and the second communication device; and wherein the controller is configured to detect that there is a failure in at least one of the plurality of first communication devices which has carried out the short distance wireless communication containing the failure pattern, when the transition of the status of the establishment of the short distance wireless communication between each of the plurality of first communication devices and the second communication device contains the failure pattern stored in the storage.

* * * * *